(Model.)
L. W. TRUE.
Cotton Chopper.
No. 238,183. Patented Feb. 22, 1881.
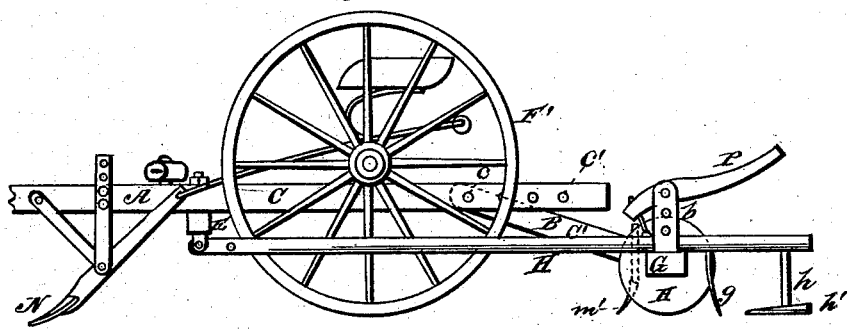
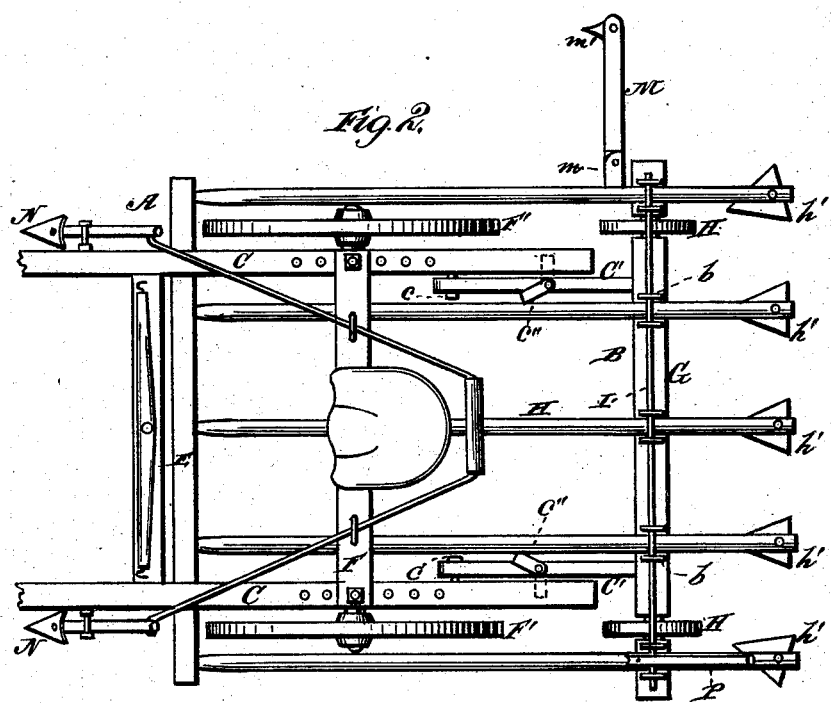
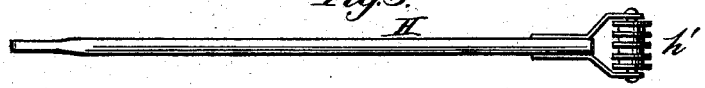
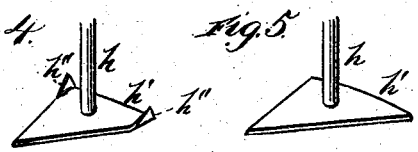 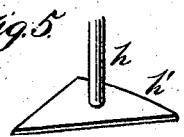 
WITNESSES
Robert Everett
W. Singleton
By his Attorney
INVENTOR
L. W. True,
E. W. Anderson

UNITED STATES PATENT OFFICE.

LORENZO W. TRUE, OF MONTGOMERY, ALABAMA, ASSIGNOR OF ONE-HALF TO HARVEY A. WILSON, OF SAME PLACE.

COTTON-CHOPPER.

SPECIFICATION forming part of Letters Patent No. 238,183, dated February 22, 1881.

Application filed October 16, 1880. (Model.)

*To all whom it may concern:*

Be it known that I, L. W. TRUE, of Montgomery, in the county of Montgomery and State of Alabama, have invented a new and valuable Improvement in Cotton-Choppers; and I do hereby declare that the following is a full, clear, and exact description of the construction and operation of the same, reference being had to the annexed drawings, making a part of this specification, and to the letters and figures of reference marked thereon.

Figure 1 of the drawings is a side view. Fig. 2 is a plan. Figs. 3, 4, 5, and 6, are detail views.

This invention relates to devices for chopping out cotton, and is so constructed that it will cut at any desired width by changes in width and size of choppers.

In the annexed drawings, A is the front, and B the rear, section of the device. The front section, A, is formed by the shaft extensions C C, cross-bar E, axle F, and large wheels F' F'. The rear section, B, consists of axle G, small wheels H H, bars C' C', and standards $b$, having the wire I running through their tops. The extensions C C and bars C' C' are bolted together by bolts $c$ and a series of holes, $c'$, whereby the length of the machine may be varied.

Upon the top of bars C' C' there are latches $c''$, by which the upper extensions and the bars are held in line, and thus the rear section is held up from the ground, which is useful in turning and in removing the machine from place to place.

To the under side of cross-bar E there is attached a series of finger-bars, H, which extend rearward and downward, between each set of standards $b$ upon axle G, one of such finger-bars being outside of the wheels on each side of the machine.

To the rear end of each finger-bar there is a dependent rod, $h$, to the lower end of which there is attached a hoe or chopper, $h'$. This chopper is in the form shown in Figs. 3, 4, 5, and 6, the style depending upon the character of work required.

Fig. 5 shows a chopper intended for ordinary use. Fig. 4 shows one the edges $h''$ of which are turned up so as to throw the dirt from the cotton. Fig. 3 shows one intended for crusty ground. Fig. 6 one for sandy ground. Attached to the finger-bars in front of the choppers is a series of colters, $g$ $g$, which are intended to clear away grass and weeds from the choppers.

Each outside finger-bar has a slotted lug, $m$, in whose slot, by a rule-joint, is hinged a marker-rod, M, the outer end of which bears a marker, $m'$.

The outside choppers and the middle one are arranged so as to follow up the tracks of the wheels and the horse.

In front of the wheels, and regulated by rods running to the driver's seat, are two plows, N, which prepare the ground in front of the wheels and render the draft easier.

Pivoted to the wire I between each pair of standards $b$ is a lever, P, with its handle running either forward or backward to suit the position of the operator whether riding or walking, by which any chopper can be lifted when a fine stalk appears in line, and it is desired to leave it.

The size of the choppers and their distance apart may be varied to suit the work to be done.

What I claim is—

1. In a cotton-chopper, the front section, A, having the finger-bars H attached thereto, in combination with the rear section, B, supporting the rear ends of said finger-bars, the two sections being hinged together, substantially as and for the purposes set forth.

2. In a cotton-chopper, the combination, with the section A and the rear section, B, hinged thereto, of the pivoted finger-bars H, passed between the uprights $b$, and provided with the choppers $h'$ and colters $g$, of the rod I and levers P, constructed and operating substantially as and for the purposes set forth.

In testimony that I claim the above I have hereunto subscribed my name in the presence of two witnesses.

LORENZO W. TRUE.

Witnesses:
  C. W. BUCKLEY,
  H. A. WILSON.